Patented Apr. 10, 1945

2,373,133

UNITED STATES PATENT OFFICE 2,373,133

SAPOGENIN DERIVATIVES AND PREPARATION OF THE SAME

Russell Earl Marker, State College, Pa., assignor to Parke, Davis & Company, Detroit, Mich., a corporation of Michigan No Drawing. Application August 3, 1940,
Serial No. 351,144

19 Claims. (Cl. 260—239.5)

This invention relates to sapogenin derivatives and preparation of the same, and more particularly to the preparation of new steroidal sapogenin derivatives hydrogenated in the side chain.

One of the objects of this invention is to prepare new steroidal sapogenin derivatives which can be used for the preparation of sex hormones and other pharmaceutically useful substances.

Another object of this invention is the preparation of new steroidal sapogenin derivatives hydrogenated in the side chain.

Further objects of this invention will be apparent from a perusal of this specification and the appended claims.

The naturally occurring steroidal saponins [Fieser, Chemistry of Natural Products Related to Phenanthrene, (Reinhold Publ. Corp., N. Y. C., 1936), p. 317 et seq.] may be hydrolyzed to yield sugars and a sugar-free moiety, designated as the aglycone. The aglycones of these steroidal saponins are designated steroidal sapogenins, and the term steroidal sapogenin is commonly employed by workers in this field to include also nuclear transformation products of these aglycones. These aglycones have, in general, the formula $C_{27}H_{42-4}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

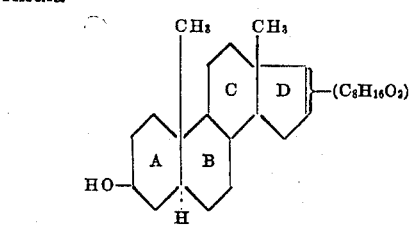

or

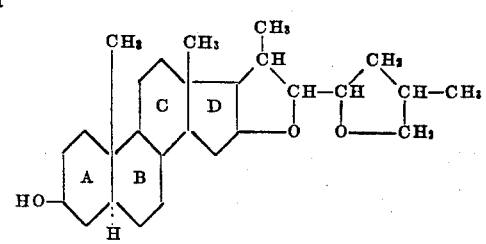

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings. These differences are shown below:

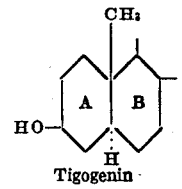
Tigogenin

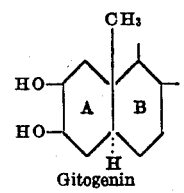
Gitogenin

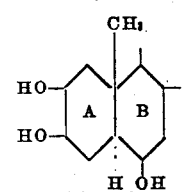
Digitogenin

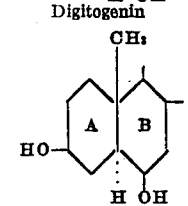
Chlorogenin

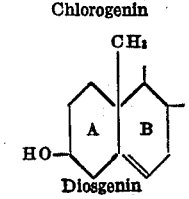
Diosgenin

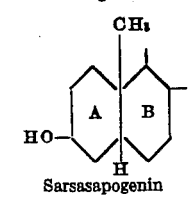
Sarsasapogenin

I have recently suggested (Marker & Rohrmann J. A. C. S. 61, 846 (1939)) that a more likely structure for the side chain of these steroidal sapogenins is that shown below.

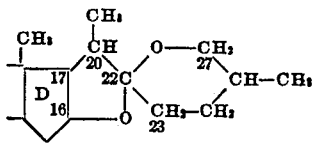

It is apparent that this formulation differs from that of Tschesche and Hagedorn in that the linkage, $C_{27}$—O—, is transferred from $C_{23}$ to $C_{22}$. However, a profound difference in the nature of the functional character of the side chain oxygen atoms is implied, for while the Tschesche-Hagedorn formula is that of an $\alpha,\alpha'$-di-tetrahydrofuryl derivative, the Marker-Rohrmann formula is that of a spiro-ketal.

Recently it has been found (Marker & Rohrmann, J. Am. Chem. Soc. 61, 846, 1516, 2724, 3479, (1939); 62, 647, 896, 1162) that the side chain of the naturally occurring sapogenins exists in two modifications. Sarsasapogenin and neotigogenin contain one type of side chain characterized by the fact that a sapogenin of this type is readily reduced according to the Clemmensen procedure using alcoholic hydrochloric acid and the amalgamated zinc (Marker & Rohrmann, J. Am. Chem. Soc. 61, 846 (1939)) to give tetrahydro derivatives, that is to say, new sapogenin derivatives in which the side chain has 4 more hydrogen atoms than in the sapogenins themselves. Tigogenin, gitogenin, digitogenin, chlorogenin and diosgenin behave differently from sarsasapogenin and neotigogenin in that they are not reduced by the Clemmensen procedure, that is to say, they are recovered unchanged after boiling with alcoholic hydrochloric acid and amalgamated zinc. Isosarsasapogenin is converted under the conditions of the Clemmensen reduction to the same tetrahydrosarsasapogenin that sarsasapogenin itself yields. These facts, and others which are cited in the references listed, appear to me to be best explained by assuming that the two types of steroidal sapogenin side chains differ in regard to optical isomerism about $C_{22}$. Accordingly, when it is necessary to distinguish between isomers about $C_{22}$ I represent the two types of side chains by formulae of the following type:

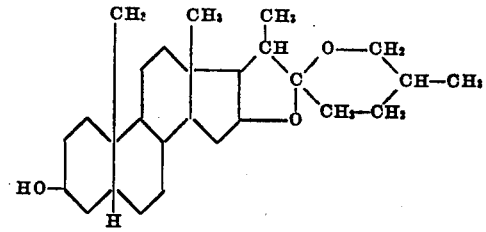

Sarsasapogenin
("Sarsasapogenin type" side chain)

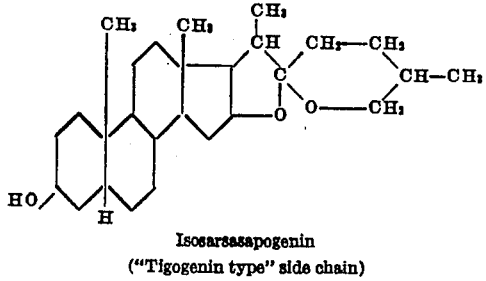

Isosarsasapogenin
("Tigogenin type" side chain)

See especially Marker & Rohrmann, J. Am Chem. Soc. 62, 896 (1940). Ordinarily where isomerism about $C_{22}$ is not of importance, the formula for the sarsasapogenin type of side chain will be used for configurations both of sarsasapogenin and tigogenin type.

These two types of sapogenin side chains appear to be subject to an equilibrium, the velocity of attainment of which is catalyzed by acidic reagents. The equilibrium is influenced by the configuration of the hydrogen atom at $C_5$, and it appears that the following rule holds true. For compounds of the allo series (cholestane type) the tigogenin type of side chain is the more stable, while for compounds of the regular series (coprostane type) at $C_5$ the sarsasapogenin side chain is the more stable.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

I have found that steroidal sapogenins may be hydrogenated under acidic conditions, especially in the presence of a catalyst such as platinum oxide to give side chain hydrogenated sapogenin derivatives which I designate as dihydrosapogenins. I have further found that only one mole of hydrogen is absorbed by the side chain and that the hydrogenation does not proceed under neutral conditions, that is to say, the presence of an organic or inorganic acid is essential for this transformation. In terms of my formula for the side chain of the sapogenins, I write this transformation in the following manner:

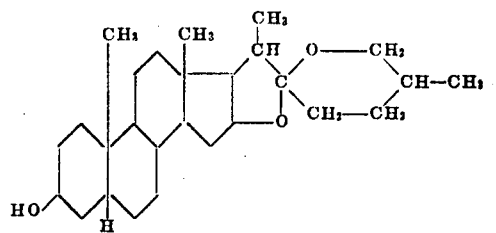

Sarsasapogenin

Hydrogenate under acidic conditions
↓

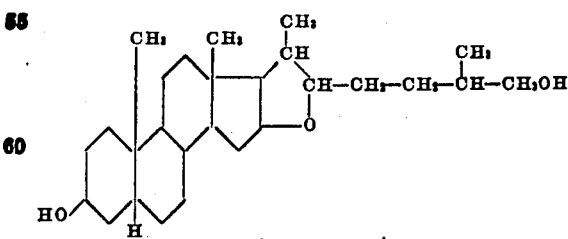

Dihydrosarsasapogenin

These dihydrosapogenins may also be represented by the following formula

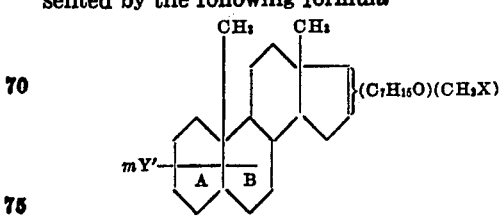

where X is a member of the class consisting of —OH and groups hydrolyzable to —OH, and where the symbol $mY'$ represents $m$ substituents on the methylene carbon atoms in the A—B portion of the steroid nucleus, said substituents being selected from the class consisting of

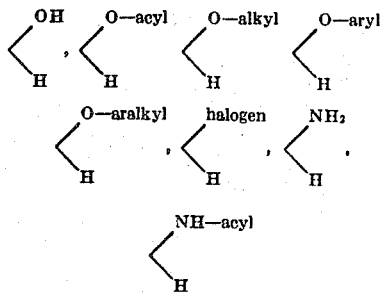

and $m$ having one of the values 0, 1, 2 and 3.

The dihydrosapogenins show many characteristic differences from the sapogenins. Thus:

(a) Whereas the sapogenins are readily brominated, for example by bromine in acetic acid, the dihydrosapogenins are unaffected by this treatment;

(b) Whereas the sapogenins, in acidic solution when shaken with hydrogen in the presence of a platinum oxide catalyst absorbs one mole of hydrogen to give dihydrosapogenins, the dihydrosapogenins show no tendency to undergo further side chain hydrogenation;

(c) Whereas the sapogenins are readily oxidized on warming for an hour with an acetic acid solution of selenium dioxide with formation of a red precipitate of metallic selenium, the dihydrosapogenins are unaffected by this treatment;

(d) Whereas the sapogenins apparently contain no side chain hydroxyl groups, the dihydrosapogenins contain a free side chain hydroxyl group as shown by the fact that esters, ethers, halides and similar derivatives involving this side chain hydroxyl group can be prepared, and furthermore it appears that this hydroxyl group of the dihydrosapogenins is a primary hydroxyl group, for the dihydrosapogenins on mild oxidation yield acids of the same carbon content but having two less hydrogen atoms than the corresponding dihydrosapogenins.

My invention may be further illustrated by the following examples:

*Example 1*

A mixture of 7 g. of sarsasapogenin acetate, one g. of Adams' platinum oxide catalyst and 150 cc. of glacial acetic acid is shaken with hydrogen at 3 atmospheres at 70° C. for 16 hours. (The Adams' catalyst is a platinum oxide catalyst made by fusing together chloroplatinic acid and sodium nitrate as described in J. Am. Chem. Soc., 45, 2171 (1923).) The mixture is filtered and the acetic acid evaporated in vacuo.

The residual sirup is the diacetate of dihydrosarsasapogenin. This sirup resists crystallization; so it is best hydrolyzed to the unacetylated parent substance.

For this purpose, the residue is refluxed with an excess of alcoholic potassium hydroxide for 30 minutes and the resulting solution poured into a large quantity of water. The aqueous mixture is extracted with ether and the ethereal extract washed with water. The ether is evaporated from the extract on a steam bath and the residue crystallized from acetone to give white needles of dihydrosarsasapogenin melting at 165–166° C. and giving on analysis almost the theoretical values for carbon and hydrogen for a compound of empirical formula $C_{27}H_{46}O_3$.

*Example 2*

One g. of sarsasapogenin acetate is mixed with 300 mg. of Adams' catalyst, 80 cc. of absolute ethyl alcohol and 2 cc. of concentrated hydrochloric acid. The mixture is shaken with hydrogen at 3 atmospheres pressure and at room temperature for 10 hours, after which it is filtered and the alcohol evaported in vacuo. The sirup remaining is the 3-monoacetate of dihydrosarsasapogenin.

It resists crystallization; so it is hydrolyzed to the parent dihydrosarsasapogenin by refluxing with an excess of alcoholic potassium hydroxide for 30 minutes. The resulting solution is poured into 300 cc. of water, the mixture extracted with ether, and the ethereal extract washed with water. The ethereal solution is evaporated to dryness on a steam bath. The residue is crystallized from acetone to give white needles of dihydrosarsasapogenin melting at 164° C. and giving no depression in melting point when mixed with a sample of dihydrosarsasapogenin prepared as described in Example 1.

When an attempt is made to carry out the hydrogenation of Examples 1 and 2 in a neutral non-acidic medium, such as absolute ethyl alcohol, there is practically no reduction and practically unchanged sarsasapogenin acetate is recovered.

If other equivalent derivatives of sarsasapogenin than the acetate are used in the transformations described above, such as those in which the hydroxyl group at the No. 3 carbon atom is esterified or etherified with groups other than the acetoxy group, analogous 3-mono-esters or 3-mono-ethers of dihydrosarsasapogenin are obtained.

In order to form derivatives of dihydrosarsasapogenin in which not only the hydroxyl group at the No. 3 carbon atom is esterified or etherified but also where the new hydroxyl group at the No. 27 carbon atom is also esterified or etherified, one can treat the dihydrosarsasapogenin-C₃-mono-acetate or -mono-ether with an esterifying or etherifying agent which will convert the hydroxyl at the No. 27 carbon atom into an ether or ester group capable of hydrolysis to give hydroxyl. Instead of reacting an ether or ester derivative of dihydrosarsasapogenin with an etherifying or esterifying agent, the same reactions can be carried out on dihydrosarsasapogenin itself, to obtain compounds of the same type, since the hydroxyl group at the No. 3 carbon atom can also be esterified or etherified at the same time as the hydroxyl group at the No. 27 carbon atom. This is illustrated by the next example, Example 3.

*Example 3*

A solution of 500 mg. of dihydrosarsasapogenin and 600 mg. of 3,5-dinitrobenzoyl chloride in 10 cc. of pyridine is heated on the steam bath for six hours and then allowed to stand at room temperature for six hours more. Then the solution is diluted with water, extracted with ether, and the pyridine removed by washing with dilute hydrochloric acid. On evaporation of the ethereal solution a residue is obtained which may be crystallized from ethyl acetate to give pale tan plates, melting point 220 C. This is the bis-3,5-dinitrobenzoate of dihydrosarsasapogenin. It may be hydrolyzed with alcoholic potassium hydroxide to give the parent dihydrosarsasapogenin.

Example 4

A mixture of 3 g. of tigogenin, 1 g. Adams' catalyst, and 100 cc. of glacial acetic acid is shaken with hydrogen at 3 atmospheres pressure at 70° for twenty hours. The mixture is filtered and the acetic acid is removed in vacuo. The residual sirup, after refluxing for twenty minutes with an excess of alcoholic potassium hydroxide, is diluted with water and the precipitated solid taken up in ether. The ethereal solution is washed with water, dried, and then the ether removed on a steam bath to give a residue which may be crystallized from acetone to yield white plates, melting point 167–168 C. This product is dihydrotigogenin.

This dihydrosapogenin, like other dihydrosapogenins, differs from the sapogenin itself in that it is not oxidized on heating with selenium dioxide and acetic acid solution nor does the dihydrosapogenin brominate when treated with bromine in acetic acid.

The dibenzoate of dihydrotigogenin is a characteristic derivative. It is prepared by adding to a solution of 200 mg. of dihydrotigogenin in 10 cc. of dry pyridine approximately 0.25 cc. of benzoyl chloride. After the mixture has stood at 25 for twenty-four hours it is heated at 95° for one hour and then poured into dilute hydrochloric acid and ether. The ethereal layer is separated, washed with water and the ether removed on the steam bath. The residue is treated with Norite and then crystallized from aqueous acetone, giving white plates of melting point 110–112° C.

Example 5

(a) Desoxysarsasapogenin is prepared, for example, as described by Marker and Rohrmann, J. Am. Chem. Soc. 61, 1284 (1939), by the action of alcoholic hydrochloric acid and unamalgamated zinc on sarsasapogenone.

(b) A mixture of 250 mg. of desoxysarsasapogenin, 100 cc. of glacial acetic acid and 500 mg. Adams' catalyst is shaken with hydrogen at 3 atmospheres pressure and 70 C. for eight hours. Then the mixture is filtered and the acetic acid evaporated in vacuo. The residual sirup is refluxed for fifteen minutes with an excess of alcoholic potassium hydroxide and the resulting solution is poured into water. The mixture is extracted with ether, the ethereal layer separated and washed with water. After removing the ether on a steam bath the residue may be crystallized from aqueous acetone to give silky white needles of dihydrodesoxysarsasapogenin of melting point 109–110° C.

In contrast to desoxysarsasapogenin, the dihydrodesoxysarsasapogenin gives no evidence of oxidation when heated at 90° C. with selenium dioxide in acetic acid-benzene solution, nor does it absorb bromine when treated with bromine in acetic acid.

Example 6

(a) To a boiling mixture of 250 mg. of tigogenone, 80 cc. of 95% ethanol and 10 g. of 20 mesh granular zinc is added, over a period of three hours, 10 cc. of concentrated hydrochloric acid. At the end of this period the solution is poured into water and the precipitated solid taken up with ether, the ethereal layer separated and the ether removed on a steam bath. The residue is crystallized from acetone to give white plates of melting point 173–174° C. This is desoxytigogenin.

(b) A mixture of 100 mg. of desoxytigogenin, 500 mg. of Adams' catalyst, 75 cc. glacial acetic acid, and 25 cc. of absolute ethanol are shaken with hydrogen at 3 atmospheres pressure and 25° C. for fourteen hours. The mixture is filtered and the acetic acid removed in vacuo. The residual sirup is refluxed twenty minutes with an excess of alcoholic potassium hydroxide and then diluted with water. The precipitated solid is collected with ether and the ethereal layer washed well with water. After removing the ether on a steam bath the residue is crystallized from aqueous acetone using some Norite to remove traces of color. As thus obtained dihydrodesoxytigogenin crystallizes as small white plates with melting point 92.5° C.

Example 7

A mixture of 2 g. of gitogenin diacetate, 1 g. of Adams' catalyst, and 100 cc. glacial acetic acid is shaken with hydrogen at 3 atmospheres pressure and 70° C. for twelve hours. Then the mixture is filtered and the acetic acid is evaporated in vacuo. The residual sirup is hydrolyzed by boiling for about twenty minutes with alcoholic sodium hydroxide. The resulting solution is diluted with water and the mixture extracted with ether. The ethereal layer is washed with water and the ether evaporated to dryness. The residue is crystallized from ethyl acetate to give fine white needles of dihydrogitogenin of melting point 195–197° C. The product, when treated with p-nitrobenzoyl chloride and pyridine, gives a tris-p-nitrobenzoate of melting point 189–191° C., which crystallizes from ether-acetone as pale yellow needles.

Example 8

(a) Isosarsasapogenin, melting point 185° C. may be prepared according to the directions of Marker and Rohrmann, J. Am. Chem. Soc., 61, 847, (1939) by refluxing sarsasapogenin with 10% alcoholic hydrochloric acid for about ninety hours. It is identical with smilagenin as isolated, for example, by Askew, Farmer, and Kon, J. Chem. Soc. p. 1399, (1936).

(b) A mixture of 250 mg. of isosarsasapogenin, 500 mg. Adams' catalyst and 80 cc. of glacial acetic acid are shaken for twelve hours with hydrogen at 3 atmospheres pressure and 70° C. The mixture is worked up in the usual manner, that is to say, by filtering from the catalyst, removing the acetic acid under reduced pressure, taking the residue up in ether, washing free of acid with water, distilling off the ether on a steam bath, and crystallizing the residue from aqueous acetone. In this fashion there is obtained dihydroisosarsasapogenin as white plates of melting point 162° C. This compound is identical with dihydrosarsapogenin of melting point 162° C. That is to say, dihydroisosarsapogenin, dihydrosmilagenin and dihydrosarsasapogenin are identical. The identity is proved not only by mixed melting points of the dihydrosapogenins, but also by mixed melting points of their derivatives, such as their bis-3,5-dinitrobenzoates, all of which melt at 220° C. and do not depress with one another.

Example 9

(a) Bromosarsasapogenin in which the bromine atom is in the side chain may be prepared as follows. A solution of 820 mg. of sarsasapogenin in 50 cc. of glacial acetic acid is cooled to 20°. Two drops of 48% hydrobromic acid are added and 2 cc. of 1.05 M bromine in acetic acid solution run in dropwise over a period of five or ten minutes. The bromine is very readily taken up with liberation of hydrogen bromide and transient formation of a blue color. Then the mixture is poured into water and the precipitated solid collected and washed with water. The solid is crystallized from aqueous acetone to give white needles of bromosarsasapogenin. It begins to decompose at about 125° C.

(b) A mixture of 1 g. of bromosarsasapogenin, and 0.5 g. of Adams' catalyst in 80 cc. of glacial acetic acid is shaken with hydrogen at 3 atmospheres pressure and 70° C. for eight hours. Then the mixture is filtered and the filtrate evaporated to a sirup in vacuo. The oily residue is diluted with water and the mixture extracted with ether. The ethereal solution is washed with water and the ether evaporated on the steam bath. The residue, which resists crystallization, is hydrolyzed by refluxing for fifteen minutes with an excess of alcoholic sodium hydroxide. Then the solution is poured into water, extracted with ether, and the ethereal extract washed with water. The ether is evaporated on the steam bath and the residue crystallized from ether-pentane to give white needles of melting point 163° C. This is dihydrosarsasapogenin and gives no depression in melting point on admixture with an authentic sample. The yield is inferior to that obtained by the method described in Examples 1 and 2.

*Example 10*

A mixture of 2 g. of digitogenin, 1 g. of Adams' platinum oxide catalyst, and 100 cc. of propionic acid is shaken with hydrogen at 3 atmospheres pressure and 70° C. for twelve hours. The mixture is filtered and the propionic acid removed under reduced pressure. The residual sirup is the propionate of dihydrodigitogenin. It is hydrolyzed in the usual manner by refluxing for about twenty minutes with aqueous alcoholic sodium hydroxide solution. The resulting solution is diluted with water, the mixture extracted with ether, and the ethereal solution washed with water and evaporated to dryness on the steam bath. The residue is crystallized from acetone to give white needles of dihydrodigitogenin of melting point 184–186°.

*Example 11*

(a) Epi-sarsasapogenin may be prepared as described, for example, by Marker and Rohrmann, J. Am. Chem. Soc. 61, 943 (1939). As so obtained, epi-sarsasapogenin has a melting point of 207° C.

(b) A mixture of 360 mg. of Adams' catalyst, and 80 cc. of glacial acetic acid is shaken with hydrogen at 3 atmospheres pressure and 70° C. for ten hours. Then the mixture is filtered and the filtrate poured into water. The resulting mixture is extracted with ether and the ether washed well with water, then evaporated to dryness on the steam bath. The residue, which cannot readily be induced to crystallize, is hydrolyzed by heating for ten minutes with an excess of alcoholic potassium hydroxide. The resulting solution is poured into water, the mixture extracted with ether, the ethereal extract is washed with water and the ether then evaporated on the steam bath. The residue is crystallized from ether-pentane to give white needles, melting point 136° C., of epi-dihydrosarsasapogenin.

Epi-dihydrosarsasapogenin differs from epi-sarsasapogenin in the fact that the side chain of the former no longer has a potential ketone group. This is shown, for example, by the fact that epi-dihydrosarsasapogenin does not react with bromine in glacial acetic acid nor with selenium dioxide in acetic acid-benzene at 90° C.

*Example 12*

(a) A mixture of 1.5 grams of chlorogenone, (Noller, J. Am. Chem. Soc., 59, 1092 (1937)), 300 mg. of Adams' catalyst, and 200 cc. of alcohol is shaken with hydrogen at room temperature in 3 atmospheres pressure for four hours. Then the mixture is filtered and the filtrate evaporated in vacuo. The residue is crystallized from aqueous alcohol and then from acetone to give about 1.2 g. of fine white needles melting at 246–248° C. When mixed with naturally occurring chlorogenin, M. P. 271–272° C. it melts at 233–250° C. This new product of melting point 246–248° C. is therefore different from the naturally occurring chlorogenin and will be designated as $\beta$-chlorogenin.

When refluxed with acetic anhydride, a diacetate is formed which may be crystallized from aqueous methanol to give the diacetate of $\beta$-chlorogenin, of melting point 120° C.

(b) A mixture of 500 mg. of $\beta$-chlorogenin, 200 mg. of Adams' catalyst, and 75 cc. of glacial acetic acid is shaken with hydrogen at room temperature and three atmospheres pressure for fifteen hours. Then the mixture is filtered and the solvent removed in vacuo. The residue is hydrolyzed by boiling with methanolic potassium hydroxide for fifteen minutes and the resulting solution poured into water. The suspension thus formed is extracted with ether, the ethereal layer washed with water and the ether removed on a steam bath. The residue may be crystallized from aqueous acetone to give compact, while crystals of dihydro-$\beta$-chlorogenin, of melting point 209–210° C. A mixture with dihydrochlorogenin, melting point 228–231° C., melts at 193–215° C.

It is believed that $\beta$-chlorogenin and its derivatives, such as the dihydro derivative, differ from naturally occurring chlorogenin and its derivatives, in regard to isomerism of the hydroxyl group at C-6.

The foregoing examples, illustrative of my invention, are subject to numerous variations in regard to the sapogenins employed, the conditions of reaction, the modes of removing the products from reaction mixtures, and the like. All of these variations, herein described and claimed, fall within the scope of my invention.

Steroidal sapogenins on which this invention may be practiced include not only the aglycones of the naturally occurring steroidal sapogenins, but also their nuclear transformation products, i. e., the substances derived from the aglycones by changes in rings A and/or B which leave the side chain attached to ring D still intact and like that in the aglycones. Thus, this invention may be practiced on steroidal sapogenins such as smilagenin, sarsasapogenone, 3-desoxysarsasapogenin, the sarsasapogenyl chlorides, and the like.

It is apparent that sapogenins having in the side chain either configuration with regard to $C_{22}$ may be employed in practicing this invention, that is to say, compounds having a side chain either of the type of sarsasapogenin or of the type tigogenin may be hydrogenated in the manner set forth in this specification, and regardless of the configuration of the side chain of the sapogenin hydrogenated the structure of the dihydro compound remains the same, for example, sarsasapogenin and isosarsasapogenin give the same dihydrosarsasapogenin.

Again, the side chain halogenated sapogenins prepared, for example, as described by Marker & Rohrmann, J. Am. Chem. Soc., 61, 846 (1939) by brominating sapogenins in an acetic acid solution may be hydrogenated in accordance with the teachings of this specification. For example, bromosarsasapogenin may be hydrogenated to give the same dihydrosarsasapogenin that is obtained by hydrogenating sarsasapogenin itself.

It will be apparent that in practicing my invention on certain types of sapogenins, transformations may occur in the nucleus in rings A and B as well as in the side chain. For example, if nuclear ketone groups are present as for example in the case of sarsasapogenone, the product obtained by the practice of my invention is dihydrosarsasapogenin. In this case it is apparent that the 3-keto group in the nucleus has also been hydrogenated after a fashion well known in steroid chemistry to give a 3-$\beta$-hydroxy group. Again, diosgenin when hydrogenated in acidic solution according to my invention gives dihydrotigogenin, and here again the hydrogenation of the $\Delta^5$ double bond occurs according to a manner familiar in steroid chemistry.

The course of the hydrogenation according to my invention is somewhat slower than that for nuclear double bonds or ketone groups, and so the reaction is conducted under conditions more vigorous than those required merely to saturate an ordinary nuclear double bond. Usually I prefer to conduct the hydrogenation for periods of from 3 to 24 hours and, while I find that the reaction proceeds at room temperature, in many cases I prefer to operate above room temperature, as for example at 50–100° C.

As acidic media in which this hydrogenation may be conducted, I prefer to use acetic acid because of its cheapness and its great solvent power for most substances; however, other organic acids are suitable such as propionic, lactic, butyric, ethoxyacetic and other organic acids. When organic acids are used for solvents for the hydrogenation, the primary hydroxyl group formed in the side chain of the sapogenin is usually esterified in the course of the reaction. This esterified hydroxyl group, and other esterified hydroxyl groups in the nucleus, may be saponified by treatment with alkali or acid, as for example by boiling for a short time with a solution of an alkali hydroxide.

Instead of using organic acids as solvents, either alone or in conjunction with other solvents such as alcohol, dioxan, ether and the like, non-acidic organic solvents may be employed in conjunction with mineral acids. Such combinations of solvents include ethyl alcoholic-hydrochloric acid, dioxan and phosphoric acid, dibutyl ether and hydrobromic acid, and similar combinations of an organic solvent and an inorganic acid at least partially soluble in the organic solvent.

When the hydrogenation is conducted using the combination of an organic non-acidic solvent and a mineral acid, the primary hydroxyl group formed in the side chain of the hydrogenated sapogenin is not esterified during the hydrogenation. This makes it possible to prepare sapogenin derivatives hydrogenated in the side chain and having nuclear esterified hydroxyl groups and a free hydroxyl group in the side chain of the dihydrosapogenin thus formed.

While platinum oxide prepared, for example, by the method of Adams (loc. cit.) is usually the best catalyst to employ on the laboratory scale, other catalysts such as Raney nickel and the various chromite catalysts such as copper chromite may also be employed. However, palladium, either in the form of palladium black or supported on barium sulphate, has not proved to be a useful catalyst for the type of hydrogenation under consideration.

It is apparent that by suitable choice of solvent the dihydrosapogenin can be formed either with a free side chain hydroxyl group or with an esterified side chain hydroxyl group. Thus it is possible by preparing first a dihydrosapogenin in which the nuclear hydroxyl groups are esterified and in which the side chain hydroxyl group is free, to convert a substance of this type to a mixed ester or ester-ether by further treatment with an acylating, etherifying, or halogenating agent. For example, sarsasapogenin acetate may be hydrogenated using alcoholic hydrochloric acid as a solvent to give the 3-mono-acetate of dihydrosarsasapogenin, and this may be treated with benzoyl chloride and pyridine to give a mixed ester of dihydrosarsasapogenin in which the 3-hydroxyl group has been acetylated and the side chain hydroxyl group has been benzoylated.

Where in the claims the term "dihydrosapogenin compound" is used, this is intended to designate any compound having the structure of a sapogenin except that the side chain contains two additional atoms of hydrogen and contains a free hydroxyl group or a group capable of hydrolysis to a hydroxyl group, the rings A, B of said sapogenin containing one or more free hydroxyl groups or groups capable of hydrolysis to hydroxyl groups.

Where the term "ring D" is used in the claims, it refers to ring D of a steroid formula such as is represented in either of the first two formulas of the specification.

What I claim as my invention is:

1. The process for preparing a dihydrosapogenin compound which comprises subjecting a member of the class consisting of sapogenins, their side chain mono-chloro derivatives and their side chain mono-bromo derivatives to catalytic hydrogenation under acidic conditions at a temperature not lower than room temperature for a length of time corresponding to at least several hours' duration.

2. Process according to claim 1 wherein a platinum oxide catalyst is employed.

3. Process according to claim 1 wherein the hydrogenation is conducted in acetic acid as a solvent.

4. Process according to claim 1 wherein the acidic conditions are obtained by using a combination of an organic solvent and a mineral acid.

5. Process according to claim 1 wherein the acidic conditions are obtained by using an organic acid as a solvent.

6. Dihydrosarsasapogenin melting at approximately 166° C.

7. Dihydrotigogenin melting at approximately 168° C.

8. The process for preparing sapogenin derivatives which comprises hydrogenating a steroidal sapogenin in the presence of a platinum catalyst under acidic conditions at 20–100° C., thereby producing a dihydrosapogenin compound, and separating said dihydrosapogenin compound.

9. The process for preparing sapogenin derivatives which comprises hydrogenating a compound of the formula

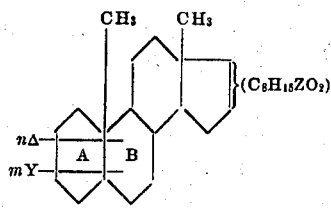

where Z is a member of the class consisting of hydrogen, chlorine and bromine, where the symbol $n\Delta$ represents $n$ carbon-to-carbon double bonds in the A—B portion of the steroid nucleus, $n$ having one of the values 0, 1, 2 and 3, and where the symbol $mY$ represents $m$ substituents on the methylene carbon atoms in the A—B portion of the steroid nucleus, said substituents being selected from the class consisting of (=O),

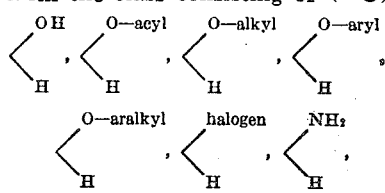

and

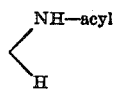

and $m$ having one of the values 0, 1, 2 and 3, $m$ and $n$ being so chosen that their sum, $m+n$, does not exceed the value 3, in an organic solvent incapable of hydrogenation of the class consisting of acylating and non-acylating agents, in the presence of a platinum catalyst under acidic conditions at 20–100° C., thereby producing a dihydrosapogenin compound of the formula

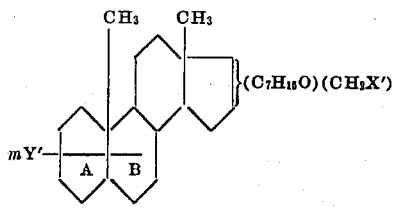

X' being —OH when said organic solvent is a non-acylating agent and X' being O-acyl when said organic solvent is an acylating agent and where the symbol $mY'$ represents $m$ substituents on the methylene carbon atoms in the A—B portion of the steroid nucleus, said substituents being selected from the class consisting of

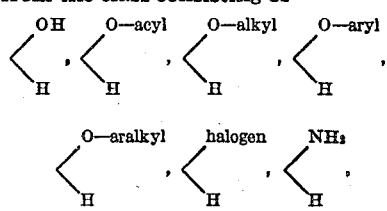

and

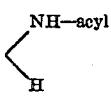

and $m$ having one of the values 0, 1, 2 and 3, and separating said dihydrosapogenin compound.

10. The process for preparing sapogenin derivatives hydrogenated in the side chain which comprises catalytically hydrogenating under acidic conditions more vigorous than those required merely to hydrogenate a nuclear double bond, a compound having the formula

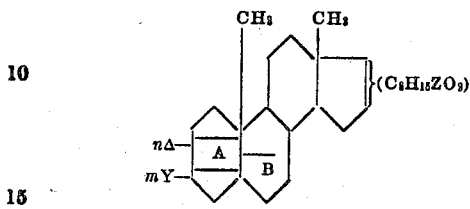

where Z is a member of the class consisting of hydrogen, clorine and bromine, where the symbol $n\Delta$ represents $n$ carbon-to-carbon double bonds in the A—B portion of the steroid nucleus, $n$ having one of the values 0, 1, 2 and 3, and where the symbol $mY$ represents $m$ substituents on the methylene carbon atoms in the A—B portion of the steroid nucleus, said substituents being selected from the class consisting of (=O),

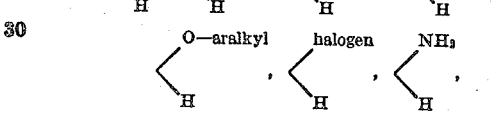

and

$m$ having one of the values 0, 1, 2 and 3, $m$ and $n$ being so chosen that their sum, $m+n$, does not exceed the value 3.

11. A compound having the formula

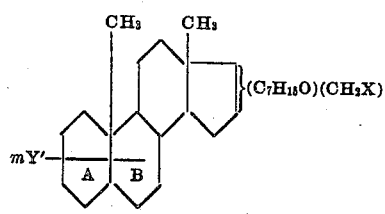

where X is a member of the class consisting of —OH and groups hydrolyzable to —OH, and where the symbol $mY'$ represents $m$ substituents on the methylene carbon atoms in the A—B portion of the steroid nucleus, said substituents being selected from the class consisting of

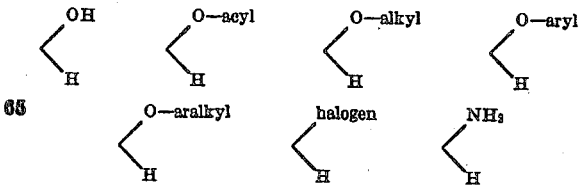

and

$m$ having one of the values 0, 1, 2 and 3.

12. A dihydrosapogenin compound of the formula,

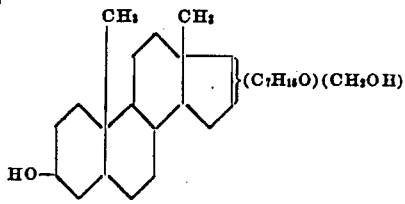

said dihydrosapogenin compound being characterized by the inertness of its side chain to the action of bromine in acetic acid and to the action of selenium dioxide in acetic acid.

13. A dihydrosapogenin compound characterized by containing in the side chain at ring D the structure,

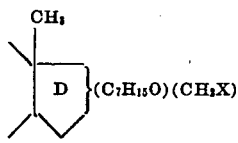

where X is a member of the class consisting of —OH and groups hydrolyzable to —OH, said side chain being inert to the action of bromine in acetic acid and to the action of selenium dioxide in acetic acid.

14. The process for preparing a dihydrosapogenin compound which comprises subjecting a sapogenin derivative of the formula,

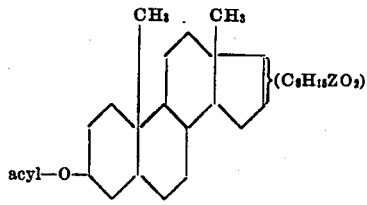

where Z is a member of the class consisting of hydrogen, chlorine and bromine, to catalytic hydrogenation under acidic conditions at a temperature not lower than room temperature for a length of time corresponding to at least several hours' duration.

15. The process for preparing a dihydrosapogenin compound which comprises subjecting a sapogenin derivative of the formula,

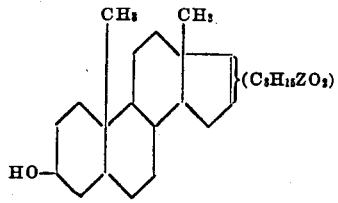

where Z is a member of the class consisting of hydrogen, chlorine and bromine, to catalytic hydrogenation under acidic conditions at a temperature not lower than room temperature for a length of time corresponding to at least several hours' duration.

16. The process for preparing a dihydrosarsasapogenin compound which comprises subjecting sarsasapogenin to catalytic hydrogenation under acidic conditions in the presence of a platinum catalyst at a temperature not lower than room temperature for a length of time corresponding to at least several hours duration.

17. The process for preparing a dihydrosarsasapogenin compound which comprises subjecting an ester of sarsasapogenin to catalytic hydrogenation under acidic conditions in the presence of a platinum catalyst at a temperature not lower than room temperature for a length of time corresponding to at least several hours' duration.

18. A dihydrosapogenin compound having the formula

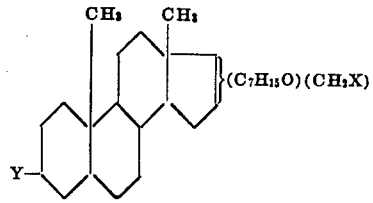

where X is a member of the class consisting of —OH and groups hydrolyzable to —OH, and Y represents a substituent of the class consisting of

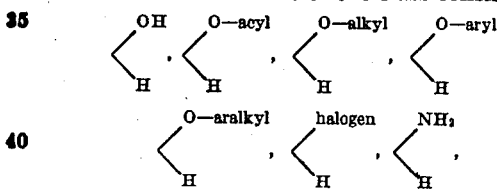

and

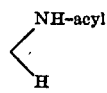

19. Dihydrochlorogenin having a melting point of approximately 228–231° C.

RUSSELL EARL MARKER.